United States Patent [19]
Odru et al.

[11] Patent Number: 5,499,661
[45] Date of Patent: Mar. 19, 1996

[54] TUBE COMPRISING COMPOSITE LAYERS WITH DIFFERENT MODULII OF ELASTICITY

[75] Inventors: Pierre Odru, Fontenay sous Bois; Charles Sparks, Le Vesinet; Marcel Auberon, Le Haillan; Jacques Behar, Saint Medard en Jalles, all of France

[73] Assignees: Institut Francais du Petrole, Rueil Malmaison; Aerospatiale, Paris, both of France

[21] Appl. No.: 438,960

[22] Filed: May 11, 1995

Related U.S. Application Data

[63] Continuation of Ser. No. 794,955, Nov. 20, 1991, abandoned, which is a continuation of Ser. No. 631,868, Dec. 21, 1990, abandoned, which is a continuation of Ser. No. 318,179, Mar. 2, 1989, abandoned.

[30] Foreign Application Priority Data

Mar. 2, 1988 [FR] France .................................. 88 02560

[51] Int. Cl.⁶ ...................................................... F16L 9/16
[52] U.S. Cl. ........................... 138/124; 138/125; 138/130; 138/153; 138/174
[58] Field of Search ................................. 138/129, 130, 138/132, 133, 134, 172, 174, 125, 126, 127, 124, 153, 176, DIG. 2, DIG. 5

[56] References Cited

U.S. PATENT DOCUMENTS

| | | | |
|---|---|---|---|
| 790,906 | 5/1905 | Marks | 138/130 |
| 1,010,088 | 11/1911 | Subers | 138/130 |
| 1,010,090 | 12/1911 | Subers | 138/130 |
| 4,039,006 | 8/1977 | Inone et al. | 138/129 |
| 4,273,160 | 6/1981 | Lowles | 138/124 |
| 4,514,245 | 4/1985 | Chabtier | 138/153 |
| 4,867,205 | 9/1989 | Bournazel et al. | 138/130 |

*Primary Examiner*—James E. Bryant, III
*Attorney, Agent, or Firm*—Antonelli, Terry, Stout & Kraus

[57] ABSTRACT

A composite material tube, withstanding the internal pressure, and comprising at least two layers of pressure reinforcement fibers, or pressure resistant layers, wound at an angle at least equal in absolute value to 70°, with respect to the center axis of the tube. The two layers both undergo radial expansion under an effect of the pressure, with one of these two layers being inside the other. A circumferential modulus of elasticity of the external layer is greater than the circumferential modulus of elasticity of the internal layer.

36 Claims, 1 Drawing Sheet

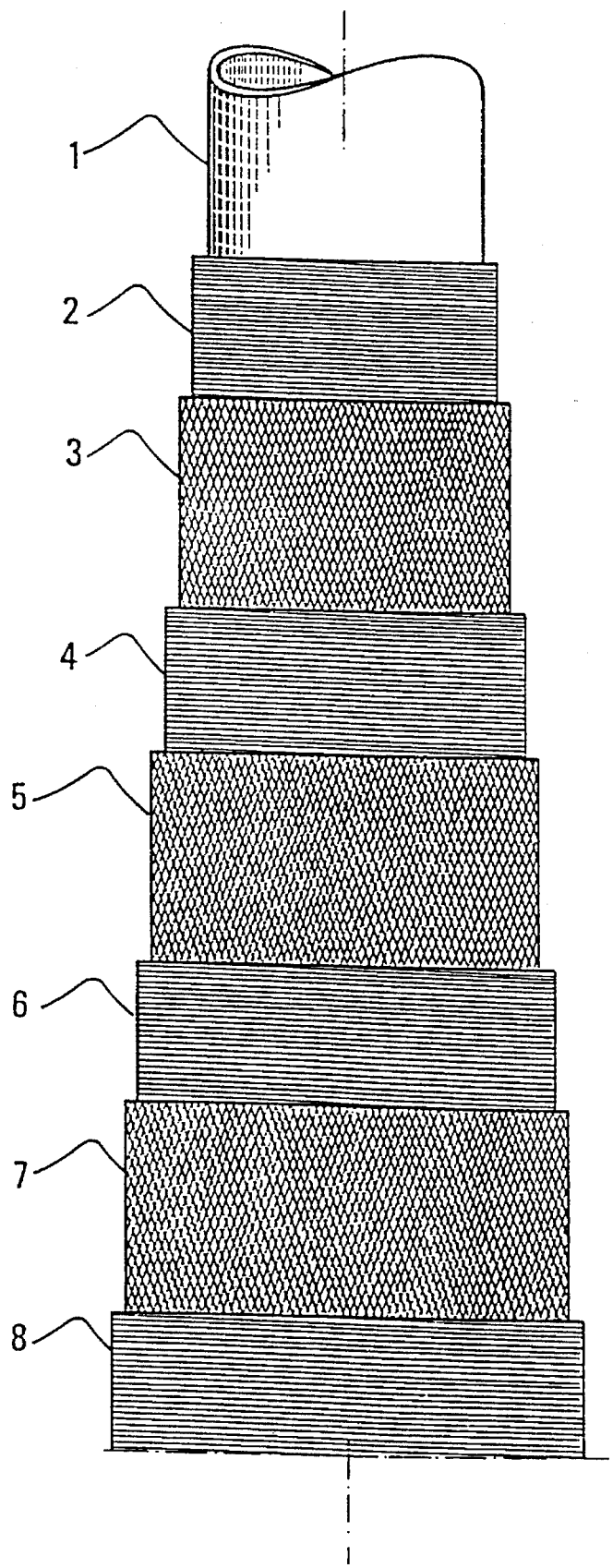

5,499,661

TUBE COMPRISING COMPOSITE LAYERS WITH DIFFERENT MODULII OF ELASTICITY

This is a Continuation Application Ser. No. 07/793,955, filed Nov. 20, 1991 now abandoned; which is a Continuation Application of U.S. Ser. No. 07/631,868, filed Dec. 21, 1990 (now abandoned); which is a Continuation of U.S. Ser. No. 07/318,179, filed Mar. 2, 1989 (now abandoned).

BACKGROUND OF THE INVENTION

The present invention relates to a new composite tube structure withstanding high pressures. Compared with tubes taught in the prior art the tubes of the invention have either a lower thickness and weight for equal service pressure, or a higher admissible pressure for equal thickness.

The invention further provides examples of economically optimized tubes.

By composite material should be understood a material formed from parallel fibers, such as type E or R glass fibers, carbon fibers, aramide fibers of Kevlar 29 or Kevlar 49 type (trademarks registered by Du Pont de Nemours) coated with a matrix such as a thermoplastic or heat hardenable material, for example, an epoxy resin. This matrix adheres to the fibers.

The invention applies, in particular, to the construction of tubes for transferring or storing fluids under pressure, such as water or hydrocarbons.

More particularly, the tubes of the invention are well adapted to be used in offshore oil working and search operations, for example, as safety lines for upgoing or downgoing standpipes connecting the bottom of the sea to a surface support such as a drilling or working platform, or such as a subsurface buoy. These standpipes are currently called risers. In the present text by composite monolayer should be understood as the juxtaposition and possibly superimposition of parallel fibers coated with a matrix. In the case of a tube, these fibers are wound at the same angle with respect to the axis of the tube.

By composite layer is meant either a monolayer, or the juxtaposition and possibly superimposition of fibers in two directions symmetrical with respect to an axis, these fibers being coated with a matrix. In the case of a tube, the fibers are wound at two opposite angles with respect to the axis of the tube.

By balanced composite layer is meant a layer comprising fibers disposed in two directions, with equal distribution of the fibers in these two directions.

The matrix adheres to the fibers. When a tube is formed from several composite layers, the matrix forms a continuous medium through these fibers to which it adheres, making the tube rigid. In the rest of this text, unless otherwise stated, the term layer will implicitly designate a composite layer.

The invention consists in winding substantially circumferentially, on a starting tube, a composite material having a circumferential modulus of elasticity higher than that of the internal, substantially circumferentially wound pressure resistant layers.

By circumferential modulus of elasticity of a composite layer wound on a tube is meant the modulus of elasticity (or Young's modulus) in a direction tangential to the layer considered, this tangent being situated in a plane perpendicular to the axis of the tube.

Composite tubes generally comprise superimposed fiber layers. As was mentioned above, in each layer these fibers are disposed at equal angles or angles symmetrical with respect to the axis of the tube and embedded in a matrix. This matrix adheres to the fibers of the different layers.

The invention applies more particularly, but not exclusively, to tubes whose layers, which only withstand, albeit completely, tractive forces are distinct from those which withstand substantially, albeit completely, pressure forces. The matrix coating the fibers of the different layers nevertheless forms a continuous medium through these fibers. The traction resistant layers comprise fibers wound at one or more small angles with respect to the axis of the tube. Similarly, the pressure resistant layers comprise fibers wound at high angles with respect to the axis of the tube. Without departing from the scope of the invention, instead of tubes comprising an external circumferential layer whose circumferential modulus of elasticity is greater than that of an internal layer, a pressure resistant casing may be formed from a composite material, such as a reservoir, comprising an external circumferential layer whose circumferential modulus of elasticity is greater than that of an internal layer.

SUMMARY OF THE INVENTION

The present invention provides a composite material tube, withstanding internal pressure and comprising at least two layers of pressure reinforcement fibers, or pressure resistant fibers, wound at an angle at least equal in absolute value to 70° with respect to the axis of the tube, the two layers both having a radial expansion under the effect of the pressure, one of these two layers being inside the other which is external thereto. This tube is characterized particularly in that the circumferential modulus of elasticity of the external layer is greater than the circumferential modulus of elasticity of the internal layer.

Preferably, no composite layer withstanding the internal pressure situated below the external layer withstanding the internal pressure may have a circumferential modulus of elasticity greater than that of the external layer.

When the tube comprises an intermediate pressure resistant layer inserted between the internal and external layers, the circumferential modulus of elasticity of the intermediate layer may be between the circumferential modulii of elasticity of the internal and external layers or equal thereto.

The angle of the pressure reinforcement layers may be at least equal to 80° or better at least equal to 85°. The angle of these layers will be preferably close to 90°.

The internal pressure resistant layer may comprise reinforcement fibers whose longitudinal Young's modulus is close to 80 000 MPA, such as glass fibers, and the external pressure resistant layer may comprise reinforcement fibers whose longitudinal Young's modulus is close to 140 000 MPa, such as the Kevlar 49 and the ratio of the thickness of the internal pressure resistant layer to that of the external pressure resistant layer may be between 0.20 and 0.50 or even 0.60.

The internal pressure resistant layer may comprise reinforcement fibers whose longitudinal Young's modulus is close to 140 000 MPa, such as the Kevlar 49 fibers, and the external pressure resistant layer may comprise reinforcement fibers whose longitudinal Young's modulus is substantially between 200 000 and 300 000 MPa, such as carbon fibers and the ratio of the thickness of the internal pressure resistant layer to that of the external pressure resistant layer may be in the range 0.15–0.30.

The tube may comprise at least one tractive force resistant layer.

The fibers of the external pressure resistant layer may be pre-stressed under traction, in the absence of pressure inside the tube.

The tube may also comprise at least two layers of tractive force resistant reinforcement fibers distributed throughout the thickness of said tube.

The tube of the invention may be used for forming pipes whose blow-out pressure is close to or higher than 100 MPa for transferring or storing fluids.

BRIEF DESCRIPTION OF THE DRAWINGS

The invention will be well understood and its advantages will be clear from the following description of a few embodiments one of which is illustrated in the accompanying Single Figure which is an isometric view of a composite material tube to which the invention is applied.

DESCRIPTION OF THE PREFERRED EMBODIMENTS

Reference 1 designates an internal sealed sheath of the tube. This internal sealed sheath 1 may be made from elastomer, from a thermoplastic or heat hardenable material such as BUNA, RILSAN (which are respectively trademarks registered by HOECHST and AT CHEM).

This internal sheath 1 may also be made from aluminium, titanium or steel. The modulus of elasticity of these materials being generally greater than that of the internal pressure resistant layers, these types of internal sheaths undergo plastic deformation. On the internal sheath 1 are wound several layers 2, 3, 4, 5, 6, 7, 8 of composites. The internal layer 2 is preferably made from fibers wound at an angle close to 90° in absolute value, with respect to the longitudinal center axis of the tube, so that this internal layer 2 takes up essentially the pressure forces due to the pressure prevailing inside the tube.

Layer 3, which takes up essentially the tractive forces which are exerted along the axis of the tube comprises fibers wound at small angles with respect to the axis of the tube, such as angles between 0° and 35°, e.g 20°. Layer 4 is a second internal pressure resistant layer and is formed like layer 2 from the same composite material, the fibers being wound as for the internal layer 2 at the same angle with respect to the longitudinal center axis of the tube. Thus, this layer 4 has the same circumferential modulus of elasticity as layer 2. Without departing from the spirit of the present invention, layer 4 may have a circumferential modulus of elasticity greater than the modulus of elasticity of layer 2, but less than or equal to that of the layers which are external thereto and which withstand the internal pressure.

Layer 5, like layer 3, is a layer withstanding the tractive forces exerted on the tube. The intermediate pressure resistant layer 6 comprises reinforcement fibers wound at an angle close to 90° with respect to the axis of the tube. This intermediate layer 6 may be formed from a composite material different from that used for layers 2 and 4. This difference of composite material may be obtained, for example, by changing the respective matrix and fiber proportions or by changing the nature of the fibers, or else by changing the nature of the matrix. What matters in the present invention is that the circumferential modulus of elasticity of the pressure resistant layers which are internal thereto is at most equal to that of the pressure resistant layers which are external thereto.

Layer 7, like layers 3 and 5, is adapted to take up the tractive forces exerted on the tube.

The external layer 8 is formed from resistant fibers wound at an angle close to 90° in absolute value, with respect to the longitudinal center axis of the tube, so as to take up the forces due to the pressure inside the tube. This external layer 8 is made from a composite material having a circumferential modulus of elasticity greater than that of the pressure resistant layers which are internal thereto.

The intermediate layer 6 may have a circumferential modulus of elasticity equal to that of layer 8 or equal to that of layer 4 or intermediate those of layers 4 and 8.

The invention will be well understood from the following example:

This example concerns the construction of a type having a service pressure between 50 and 100 MPa with a safety coefficient of 2, conferring thereon a theoretic maximum blow-out pressure of the order of 200 MPa. The wall of this tube comprises:

five layers of composite fiber-resin materials wound at a small angle with respect to the axis of the tube and taking up the tractive forces; these composite material layers are spread out relatively homogeneously inside the wall;

a layer of composite glass fiber-resin materials having a winding angle close to 90° with respect to the axis of the tube, this layer being disposed from the inside of the tube; and a layer of composite Kevlar fiber-resin materials having a winding angle close to 90° with respect to the axis of the tube, this layer being disposed externally to the glass fibers.

By way of indication, such a tube may have an internal radius of 5.3 cm and an external radius of 7.3 cm (thickness/external radius ratio : 38; this phenomenon depends solely on the ratios and not on the absolute values). The layers of longitudinal pressure resistant composites represent a cumulative thickness of 0.66 cm and are evenly spaced apart.

The circumferential composite layers, i.e. the pressure resistant layers, represent a cumulative thickness of 1.34 cm.

The following table gives the maximum circumferential and radial stresses calculated in the different internal glass-resin composite layers on the one hand and external Kevlar-resin layers on the other, as a function of their respective thicknesses, for an internal pressure of 210 MPa. This table is only relative to pressure resistant layers.

| Thickness $\frac{\text{glass composite}}{\text{Kevlar composite}}$ | glass composite stresses | | Kevlar composite stresses | |
|---|---|---|---|---|
| | radial MPa | circ MPa | radial | circ |
| 100% | −210 | 1050 | — | — |
| 73% | −210 | 960 | −45 | 900 |
| 60% | −210 | 927 | −68 | 923 |
| 48% | −210 | 895 | −91 | 953 |
| 36% | −210 | 867 | −117 | 1000 |
| 24% | −210 | 840 | −144 | 1060 |
| 12% | −210 | 820 | −175 | 1144 |
| 0% | | | −219 | 1250 |

The above table shows the radial and circumferential stresses of the glass composite layer and of the Kevlar composite layer expressed in MPa. The following phenomenon will then be noted: the reinforcement of the glass layers by external Kevlar layers having a higher circumferential modulus of elasticity causes, for equal material thickness, a reduction of the maximum stresses, not only in the glass but also in the Kevlar, and correlatively an increase of the admissible stresses and of the blow-out and service pressures of the tube.

Furthermore, the circumferential stresses induced in the Kevlar pressure resistant layers may be higher, taking into the account that the fact that the radial stresses are reduced.

Thus, if we accept for example that the maximum admissible stresses are the same in the Kevlar composite and the glass composite, and if we take for breakage criteria the maximum induced circumferential stress alone, the optimum proportion is situated at 60% for which the corresponding stresses in the glass composite and the Kevlar composite are identical. The gain in performance is then of the order of 10% without changing the thickness of the tube.

If we take a combined criterion as resistance criterion, the optimum proportion will be lower, probably of the order of 30% to 50%, with an induced gain in performance which may reach 15% to 20%.

In fact, at very high pressures, the material of the wall must withstand the circumferential tractive forces and hydrostatic compression : at 2100 bars (21 hbars of transverse radial compressive stress on the composite), the criteria (Tsai-Hill) indicate that the tractive force characteristics in the direction of the fibers are considerably reduced. The reinforcement considerably relieves the tractive stress on the internal fibers which take up the maximum transverse compression and transfer this tractive stress to the external more rigid fibers of the material which are less loaded under transverse compression.

Without departing from the scope of the invention, the number of pressure or tractive force resistant layers may be reduced or increased and the distribution of these layers modified.

What is claimed is:

1. A hollow tube comprising:

means for transferring or storing water or hydrocarbons under pressure, the means for transferring or storing having an interior surface for contacting the water or hydrocarbons under pressure and an exterior surface separated by a wall thickness with the interior surface being subjected to the pressure of the water or hydrocarbons in a radially outward direction from a center of the means for transferring or storing;

a plurality of pressure resisting means for resisting the radial outward pressure of the water or hydrocarbons on the means for transferring or storing, each pressure resisting means having an interior surface and an exterior surface separated by a wall thickness, an innermost pressure resisting means having its interior surface in surface contact with the exterior surface of the means for transferring or storing and an exterior pressure resisting means being located farthest from the center of the means for transferring or storing;

at least one tractive force resisting means for resisting tractive forces applied to the hollow tube along a longitudinal axis of the tube, each tractive force resisting means having an interior surface and an exterior surface separated by a wall thickness with each tractive force resisting means being disposed between a pair of the plurality of pressure resisting means with the interior surface of each tractive force resisting means being in surface contact with an exterior surface of a different one of the plurality of the pressure resisting means and the exterior surface of each of tractive force resisting means being in surface contact with an interior surface of a different one of the pressure resisting means; and wherein each of the plurality of pressure resisting means comprises a fiber coated with a matrix to form a composite and is wound at an angle greater than 70° with respect to a longitudinal axis of the tube, each of the at least one tractive force resisting means comprises a fiber coated with a matrix to form a composite and is wound with an angle between 0° and 30° with respect to the longitudinal axis of the tube, a circumferential modulus of elasticity of the exterior pressure resisting means is greater than a circumferential modulus of elasticity of internal pressure resisting means and any pressure resisting means disposed between the innermost and the exterior pressure resisting means has a circumferential modulus of elasticity which is between the circumferential modulii of elasticity of the innermost and exterior pressure resisting means and the means for transferring or storing has a circumferential modulus of elasticity which is greater than a circumferential modulus of elasticity of each pressure resisting means which is inside of the exterior pressure resisting means.

2. A hollow tube in accordance with claim 1 wherein:

the means for transferring or storing includes a material chosen from the group consisting of thermoplastics, aluminum, titanium and steel.

3. A hollow tube in accordance with claim 1 wherein:

the fiber of the pressure resisting means is chosen from the group consisting of glass, carbon and aramid fibers.

4. A hollow tube in accordance with claim 2 wherein:

the fiber of the pressure resisting means is chosen from the group consisting of glass, carbon and aramid fibers.

5. A hollow tube in accordance with claim 1 wherein:

the fiber of each of the pressure resisting means, disposed in a layer inside of a layer containing the exterior pressure resisting means, has a longitudinal Youngs modulus approximately between 80,000 and 140,000 MPA; and the fiber of the exterior pressure resisting means has a longitudinal Youngs modulus approximately between 200,000 and 300,000 MPA.

6. A hollow tube in accordance with claim 2 wherein:

the fiber of each of the pressure resisting means, disposed in a layer inside of a layer containing the exterior pressure resisting means, has a longitudinal Youngs modulus approximately between 80,000 and 140,000 MPA; and the fiber of the exterior pressure resisting means has a longitudinal Youngs modulus approximately between 200,000 and 300,000 MPA.

7. A hollow tube in accordance with claim 3 wherein:

the fiber of each of the pressure resisting means, disposed in a layer inside of a layer containing the exterior pressure resisting means, has a longitudinal Youngs modulus approximately between 80,000 and 140,000 MPA; and the fiber of the exterior pressure resisting means has a longitudinal Youngs modulus approximately between 200,000 and 300,000 MPA.

8. A hollow tube in accordance with claim 4 wherein:

the fiber of each of the pressure resisting means, disposed in a layer inside of a layer containing the exterior pressure resisting means, has a longitudinal Youngs modulus approximately between 80,000 and 140,000 MPA; and the fiber of the exterior pressure resisting means has a longitudinal Youngs modulus approximately between 200,000 and 300,000 MPA.

9. A hollow tube in accordance with claim 1 wherein:
the fiber of at least one of the internal pressure resisting means is glass fiber and the fiber of the external pressure resisting means is aramid fiber.

10. A hollow tube in accordance with claim 2 wherein:
the fiber of at least one of the internal pressure resisting means is glass fiber and the fiber of the external pressure resisting means is aramid fiber.

11. A hollow tube in accordance with claim 5 wherein:
the fiber of at least one of the internal pressure resisting means is glass fiber and the fiber of the external pressure resisting means is aramid fiber.

12. A hollow tube in accordance with claim 8 wherein:
the fiber of at least one of the internal pressure resisting means is glass fiber and the fiber of the external pressure resisting means is aramid fiber.

13. A hollow tube in accordance with claim 6 wherein:
a ratio of the wall thickness of one of the internal pressure resisting means to the external pressure resisting means ranges between 0.15 and 0.60.

14. A hollow tube in accordance with claim 2 wherein:
a ratio of the wall thickness of one of the internal pressure resisting means to the external pressure resisting means ranges between 0.15 and 0.60.

15. A hollow tube in accordance with claim 3 wherein:
a ratio of the wall thickness of one of the internal pressure resisting means to the external pressure resisting means ranges between 0.15 and 0.60.

16. A hollow tube in accordance with claim 4 wherein:
a ratio of the wall thickness of one of the internal pressure resisting means to the external pressure resisting means ranges between 0.15 and 0.60.

17. A hollow tube in accordance with claim 5 wherein:
a ratio of the wall thickness of one of the internal pressure resisting means to the external pressure resisting means ranges between 0.15 and 0.60.

18. A hollow tube in accordance with claim 6 wherein:
a ratio of the wall thickness of one of the internal pressure resisting means to the external pressure resisting means ranges between 0.15 and 0.60.

19. A hollow tube in accordance with claim 7 wherein:
a ratio of the wall thickness of one of the internal pressure resisting means to the external pressure resisting means ranges between 0.15 and 0.60.

20. A hollow tube in accordance with claim 8 wherein:
a ratio of the wall thickness of one of the internal pressure resisting means to the external pressure resisting means ranges between 0.15 and 0.60.

21. A hollow tube in accordance with claim 9 wherein:
a ratio of the wall thickness of one of the internal pressure resisting means to the external pressure resisting means ranges between 0.15 and 0.60.

22. A hollow tube in accordance with claim 10 wherein:
a ratio of the wall thickness of one of the internal pressure resisting means to the external pressure resisting means ranges between 0.15 and 0.60.

23. A hollow tube in accordance with claim 11 wherein:
a ratio of the wall thickness of one of the internal pressure resisting means to the external pressure resisting means ranges between 0.15 and 0.60.

24. A hollow tube in accordance with claim 12 wherein:
a ratio of the wall thickness of one of the internal pressure resisting means to the external pressure resisting means ranges between 0.15 and 0.60.

25. A hollow tube in accordance with claim 1 wherein: the angle of winding of the fiber of at least one of the pressure resisting means is greater than 85°.

26. A hollow tube in accordance with claim 2 wherein: the angle of winding of the fiber of at least one of the pressure resisting means is greater than 85°.

27. A hollow tube in accordance with claim 3 wherein: the angle of winding of the fiber of at least one of the pressure resisting means is greater than 85°.

28. A hollow tube in accordance with claim 5 wherein: the angle of winding of the fiber of at least one of the pressure resisting means is greater than 85°.

29. A hollow tube in accordance with claim 9 wherein: the angle of winding of the fiber of at least one of the pressure resisting means is greater than 85°.

30. A hollow tube in accordance with claim 13 wherein: the angle of winding of the fiber of at least one of the pressure resisting means is greater than 85°.

31. A hollow tube in accordance with claim 1 wherein: the blowout pressure is between 50 and 100 MPA.

32. A hollow tube in accordance with claim 2 wherein: the blowout pressure is between 50 and 100 MPA.

33. A hollow tube in accordance with claim 3 wherein: the blowout pressure is between 50 and 100 MPA.

34. A hollow tube in accordance with claim 5 wherein: the blowout pressure is between 50 and 100 MPA.

35. A hollow tube in accordance with claim 9 wherein: the blowout pressure is between 50 and 100 MPA.

36. A hollow tube in accordance with claim 13 wherein: the blowout pressure is between 50 and 100 MPA.

* * * * *